(12) United States Patent
Norp et al.

(10) Patent No.: US 11,310,652 B2
(45) Date of Patent: Apr. 19, 2022

(54) SYSTEM AND METHODS FOR REGISTERING WIRELESS DEVICES AND TRANSMITTING INFORMATION

(71) Applicants: Koninklijke KPN N.V., Rotterdam (NL); Nederlandse Organisatie voor Toegepast-Natuurwetenschappelijk Onderzoek TNO, 's-Gravenhage (NL)

(72) Inventors: Antonius Norp, The Hague (NL); José Almodóvar Chico, Delft (NL); Michael Schenk, The Hague (NL); Sander de Kievit, Leiden (NL)

(73) Assignees: Koninklijke KPN N.V., Rotterdam (NL); Nederlandse Organisatie Voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 572 days.

(21) Appl. No.: 16/069,152

(22) PCT Filed: Jan. 13, 2017

(86) PCT No.: PCT/EP2017/050728
§ 371 (c)(1),
(2) Date: Jul. 10, 2018

(87) PCT Pub. No.: WO2017/121882
PCT Pub. Date: Jul. 20, 2017

(65) Prior Publication Data
US 2021/0044957 A1 Feb. 11, 2021

(30) Foreign Application Priority Data

Jan. 15, 2016 (EP) .................................. 16151534

(51) Int. Cl.
*H04W 8/04* (2009.01)
*H04W 8/00* (2009.01)
(Continued)

(52) U.S. Cl.
CPC ............. *H04W 8/04* (2013.01); *H04W 8/005* (2013.01); *H04W 8/183* (2013.01); *H04W 8/26* (2013.01); *H04W 4/70* (2018.02); *H04W 4/80* (2018.02)

(58) Field of Classification Search
CPC ........... H04W 8/04; H04W 8/26; H04W 4/80; H04W 8/183; H04W 8/005
See application file for complete search history.

(56) References Cited

U.S. PATENT DOCUMENTS

2011/0225368 A1* 9/2011 Burge, III ............... H04W 4/02
711/118
2013/0321129 A1 12/2013 Swenson, Jr. et al.
(Continued)

FOREIGN PATENT DOCUMENTS

WO 2014/027273 A1 2/2014
WO 2014/187601 A1 11/2014
(Continued)

OTHER PUBLICATIONS

European Patent Office, Extended European Search Report for EP Pat. App. No. 16151534.1, dated Sep. 29, 2016.
(Continued)

*Primary Examiner* — Walli Z Butt
*Assistant Examiner* — Shawn D Miller
(74) *Attorney, Agent, or Firm* — McDonnell Boehnen Hulbert & Berghoff LLP

(57) ABSTRACT

The invention relates to a system comprising a mobile device (1), a device (13b) for transmitting information, a device (15) hosting a device registry (14) and a wireless device (3a). The mobile device (1) comprises a receiver, a transmitter, storage means and a processor. The processor is configured to use the receiver to determine that a wireless device (3a) has newly connected to the mobile device (1), to (Continued)

store or update a profile corresponding to the wireless device (3a) on the storage means, to use the transmitter to transmit first information to at least one device registry (14), the first information comprising an identifier of the wireless device (3a), to use the receiver to determine that a status of the wireless device (3a) has changed to a new status, to update or remove the profile stored on the storage means if the status of the wireless device (3a) has changed co to the new status, and to use the transmitter to transmit second information to the at least one device registry (14) if the status of the new wireless device (3a) has changed to the new status, the second information comprising the identifier of the wireless device (3a) and the new status. The invention further relates to a device (13b) for transmitting information, the methods performed by these devices and one or more computer program products enabling a computer system to perform these methods.

12 Claims, 9 Drawing Sheets

(51) Int. Cl.
*H04W 8/18* (2009.01)
*H04W 8/26* (2009.01)
*H04W 4/70* (2018.01)
*H04W 4/80* (2018.01)

(56) References Cited

U.S. PATENT DOCUMENTS

2016/0295358 A1* 10/2016 Cariss ............... H04W 4/30
2019/0116087 A1*  4/2019 Hiller ............... H04L 67/12

FOREIGN PATENT DOCUMENTS

| WO | 2015/044677 A1 | 4/2015 | |
|---|---|---|---|
| WO | 2015/149107 A1 | 10/2015 | |
| WO | WO-2015149107 A1 * | 10/2015 | ......... G06Q 10/0833 |

OTHER PUBLICATIONS

International Searching Authority, International Search Report and Written Opinion for PCT Pat. App. No. PCT/EP2017/050728, dated Jun. 9, 2017.

Third Generation Partnership Project, 3GPP TS 23.002 V13.4.0 "Technical Specification Group Services and System Aspects;Network architecture (Release 13)", Dec. 15, 2015.

Third Generation Partnership Project, 3GPP TS 23.401 V13.5.0 "Technical Specification Group Services and System Aspects; General Packet Radio Service (GPRS) enhancements for Evolved Universal Terrestrial Radio Access Network (E-UTRAN) access (Release 13)", Dec. 15, 2015.

* cited by examiner

SYSTEM AND METHODS FOR REGISTERING WIRELESS DEVICES AND TRANSMITTING INFORMATION

CROSS REFERENCE TO RELATED APPLICATIONS

This application is a national stage entry of, and claims priority to, PCT Pat. App. No. PCT/EP2017/050728, filed Jan. 3, 2017, which claims priority to European Pat. App. No. 16151534.1, filed Jan. 15, 2016, all of which are fully incorporated herein by reference for all purposes.

FIELD OF THE INVENTION

The invention relates to a mobile device, e.g. a mobile phone, a device registry, a device for transmitting information, a wireless device, e.g. a wearable device, and a system comprising such devices.

The invention further relates to a method of connecting to a wireless device, a method of registering wireless devices, a method of transmitting information, and a method of connecting to a mobile device.

The invention also relates to a computer program product enabling a computer system to perform any of such methods.

BACKGROUND OF THE INVENTION

The amount of devices that is able to connect to the Internet of Things is expected to grow enormously. It is estimated that by the year 2020 50 billion devices will be connected. Therefore, it is no surprise that industry efforts and investments are directed towards this field. The new generation of mobile systems, 5G, is expected to bring new network and services capabilities. One aspect of the new capabilities relates to device-to-device (D2D) communication.

WO2014/187601 discloses a method and system for device-to-device discovery. With the disclosed system, a device is able to discover services without having to continuously scan its surroundings. In the disclosed system, a base station broadcasts a list of services offered by certain service offering devices, receives a request from a device that wants to use a certain one of these services and transmits a message to this device and at least one of the service offering devices in order to link them to each other.

A drawback of this system is that it is not suited for wearable devices. Wearable devices are typically only able to connect wirelessly to nearby mobile devices, e.g. using Bluetooth, and are not able to receive information from or transmit information to base stations. Device-to-device communication involving wearable devices is often limited to short range communication only and if not, then short range communication is often preferred, e.g. for battery consumption reasons. As a result, these wearable devices are only able to communicate with devices, e.g. servers, in their direct vicinity.

SUMMARY OF THE INVENTION

It is a first object of the invention to provide a mobile device, which enables more devices to transmit information to wireless devices that can only communicate over a short range or that prefer communicating over a short range.

It is a second object of the invention to provide a device hosting a device registry, which enables more devices to transmit information to wireless devices that can only communicate over a short range or that prefer communicating over a short range.

It is a third object of the invention to provide a device for transmitting information, which enables more devices to transmit information to wireless devices that can only communicate over a short range or that prefer communicating over a short range.

It is a fourth object of the invention to provide a wireless device, which enables more devices to transmit information to wireless devices that can only communicate over a short range or that prefer communicating over a short range.

It is a fifth object of the invention to provide a method of connecting to a wireless device, which enables more devices to transmit information to wireless devices that can only communicate over a short range or that prefer communicating over a short range.

It is a sixth object of the invention to provide a method of registering wireless devices, which enables more devices to transmit information to wireless devices that can only communicate over a short range or that prefer communicating over a short range.

It is a seventh object of the invention to provide a method of transmitting information, which enables more devices to transmit information to wireless devices that can only communicate over a short range or that prefer communicating over a short range.

It is an eighth object of the invention to provide a method of connecting to a mobile device, which enables more devices to transmit information to wireless devices that can only communicate over a short range or that prefer communicating over a short range.

According to the invention, the first object is realized in that the mobile device comprises at least one receiver, at least one transmitter, storage means, and a processor configured to use said at least one receiver to determine that a wireless device has newly connected to said mobile device, to store or update a profile corresponding to said wireless device on said storage means, to use said at least one transmitter to transmit first information to at least one device registry, said first information comprising an identifier of said wireless device, to use said at least one receiver to determine that a status of said wireless device has changed to a new status, to update or remove said profile stored on said storage means if said status of said wireless device has changed to said new status, and to use said at least one transmitter to transmit second information to said at least one device registry if said status of said wireless device has changed to said new status, said second information comprising said identifier of said wireless device and said new status.

The wireless device may be, for example, a body area network (BAN) client, e.g. a wearable device. The mobile device may be a mobile phone, a tablet or a component of a car, for example. The mobile device does not necessarily have a user interface: the mobile device may only communicate with other devices (machine-to-machine communication). The device registry may be installed on a dedicated server, on a server that wants to transmit information to the wireless device, or on another device that wants to transmit information to the wireless device. The identifier of the wearable device only needs to be unique on the mobile device, but may be further unique on a higher level or even globally unique. The identifier of the wireless device may be a (e.g. Bluetooth) device ID provided by the wireless device, for example. The at least one receiver may comprise multiple receivers and the at least one transmitter may comprise multiple transmitters, e.g. because different radio technologies are used to communicate to the device registry than to the wireless device. The at least one receiver and the at least one transmitter may use Wireless LAN technology, e.g. Wi-Fi, or cellular communication technology, such as GPRS, CDMA, UMTS and/or LTE, to communicate with the device registry and the device for transmitting information, for example. The at least one receiver and the at least one transmitter may use BAN/PAN technologies such as Bluetooth (Low Energy), NFC, ZigBee and LTE Proximity Services (including LTE D2D) to communicate with the wireless devices, for example.

By introducing a device registry which servers and other devices can consult in order to determine which wireless, e.g. wearable, devices they can or should contact in relation to a certain service and by giving the mobile devices to which wearable devices connect the responsibility for ensuring that this device registry is up to date, more devices are able to transmit information to these wireless devices via the mobile device. This is especially beneficial for wireless devices that can only communicate over a short range, although wireless devices that are able to connect to the Internet without the mobile device, e.g. by communicating via a mobile network by themselves, may also be able to benefit from the device registry and may connect to the Internet less often as a result. The mobile device may passively monitor the wireless device's communication frequency (or frequencies) or may actively try to poll the wireless device, e.g. in order to determine whether it is still present (and therefore connected to the mobile device), for example.

The invention allows a server to send software updates to wireless devices that are registered in a certain device registry, for example. The invention further allows (wireless) devices to find each other to provide multi-user services, for example. An example can be wireless game consoles used to play multi-user games. In this case, a device registry may be associated with a single game (title) or with multiple games, e.g. of the same company. Another example can be a physician using an analytic device (or application on a device) to read health data from the sensors that a patient is wearing.

Said processor of said mobile device may be further configured to use an identifier of said wireless device to determine at least one address of said at least one device registry from associations between wireless devices and device registries stored on said storage means. The at least one address may comprise an IP address or a globally unique mobile identity, for example. By using these associations stored on the mobile device, the mobile device can be used to specify and control which devices can transmit information to the wireless devices connected to the mobile device. As each device registry may be associated with one or more devices, e.g. servers, selecting which registry to update controls which devices can find (and transmit information to) the connected wireless devices. The identifier of the wireless device may be the same identifier as is sent to the device registry.

The mobile device can thus have a list of registries that it needs to update. This list may be configured by the owner of the mobile device and/or wireless device. Typically, not all wireless devices connected to the same mobile device will be listed in the same registry, because different wireless devices want to receive information from different devices. Typically, each wireless device will be associated with a different list of registries. For example, information from one wireless device (e.g. heart rate monitor) is sent to one list of registries and information from a game console is sent to another list of registries. The list may also contain information about which part of the additional status information (additionally to the wireless device being connected or not) is sent to which registry. Different wireless devices may have different status information that they can share. For example, a wireless headset has different status information, e.g. sound level, than a temperature sensor or a wirelessly connected toy.

Said processor of said mobile device may be further configured to use an identifier of said wireless device to determine whether to transmit said second information to said at least one device registry from associations between wireless devices and device registries stored on said storage means. This allows users of wearable devices to manage/control which device registries, and devices, e.g. servers, will be updated with information about the status of the wireless device. In general, it may be advantageous to update multiple registries. On the other hand, the user of the wireless device may want to have control over the distribution of status information, for example because of privacy concerns. The identifier of the wireless device may be the same identifier as is sent to the device registry.

Said processor of said mobile device may be configured to use said at least one receiver to determine that said wireless device is no longer connected to said mobile device, to update or remove said profile stored on said storage means if said wireless device is no longer connected to said mobile device, and to use said at least one transmitter to transmit said second information to said device registry if said wireless device is no longer connected to said mobile device, said new status of said second information informing said at least one device registry that said wireless device is no longer connected to said mobile device. An important status change is the wireless device no longer being connected. As an alternative to informing the device registry that the wireless device is no longer connected to the mobile device, the device registry may be able to conclude this from the mobile device not informing the device registry that the wireless device is still connected to the mobile device.

Said processor of said mobile device may be further configured to use said at least one receiver to receive information from a device for transmitting information, said information comprising an identifier of a wireless device and further comprising at least one of data and a request, to determine from profiles stored on said storage means whether said wireless device is currently connected to said mobile device, and to use said at least one transmitter to transmit said at least one of said data and said request to said wireless device if said wireless device is determined to be currently connected to said mobile device. Although the wireless device will often still be connected to the mobile device when the mobile device receives information for the wireless device, because the mobile device keeps the device registry up to date, the mobile device may confirm this with the storage means before forwarding the information, for example. If the mobile device turns out to no longer be connected to the wireless device, the mobile device may cache the information intended for the wireless device until it reconnects. This is advantageous for some forms of information that do not have to be delivered within an immediate time constraint (e.g. software/firmware updates). The mobile device may further check whether the device for transmitting information is allowed to transmit information to this particular wireless device.

Said processor of said mobile device may be further configured to use said at least one receiver to receive registry information from said wireless device and to determine at least one address of at least one of said at least one device registry based on said registry information. The registry information may comprise, for example, an address of a device registry and/or a wireless device identity that can be used to determine an address of a device registry (e.g. based on a domain name). A heart rate sensor may transmit to the mobile device the identifier or address of a device, e.g. a server, that analyzes the heart rate of the wearer over time and that provides feedback to the wearer, for example.

Said mobile device may further comprise an interface configured to allow at least one of a user of said mobile device and an application running on said mobile device to associate said wireless device with at least one identifier of at least one of said at least one device registry, said at least one identifier comprising at least one address of said at least one of said at least one device registry or allowing said mobile device to obtain at least one address of said at least one of said at least one device registry. For example, if the wireless device does not transmit this identifier or this address to the mobile device, a user may be able to configure this himself, e.g. using a touchscreen of the mobile device. Alternatively, the user may use an application on the mobile phone to find and/or configure this identifier. An application running on the mobile device may allow the user of the mobile device to associate the wireless device with the at least one identifier of at least one of the at least one device registry, but the application might alternatively use other logic to make this association. For example, the application may be a network gaming app that allows the user to find other players and then subsequently provides the device registry addresses associated with the selected other players.

Said mobile device may further comprise an interface configured to allow at least one of a user of said mobile device and an application running on said mobile device to specify which devices are allowed to transmit information to said wireless device. This allows users of wearable devices to manage/control which devices, e.g. servers, can communicate with the wearable devices, which is normally not possible due to the limited user interfaces of the wearable devices. A user will typically not associate a wireless device with a device registry that is not used by a device that transmits information that the user is interested in. However, a device registry may be used by both devices that transmit information that the user is interested in and devices that do not transmit information that the user is interested in. The mobile device only needs to forward information that the user is interested in, received from such a device registry, to the wireless device.

Said transmitter may be configured to transmit said first information and said second information over a cellular communication network. This allows the mobile device to update the device registry even when the user of the mobile device is travelling.

According to the invention, the second object is realized in that the device hosting the device registry comprises at least one receiver, at least one transmitter and a processor configured to use said at least one receiver to receive first information from a mobile device, said first information comprising an identifier of a wireless device connected to said mobile device, to store or update a profile comprising said identifier of said wireless device on a storage facility, said profile enabling a device for transmitting information to transmit information to said mobile device, to use said at least one receiver to receive a request from a device for transmitting information, said request requesting said device registry to transmit at least part of at least one profile to said device for transmitting information, to obtain said at least one profile from said storage facility, to use said at least one transmitter to transmit said at least part of said at least one profile to said device for transmitting information, to use said at least one receiver to receive second information from said mobile device, said second information comprising said identifier of said wireless device and a new status of said wireless device, and to update or remove said profile stored on said storage facility upon receiving said second information. The profile may further store one or more identifiers of the service(s) for which the wireless device wants receive information. This is beneficial if a single device registry is used by/for multiple services, for example.

Said request may comprise at least one identifier identifying said at least one profile and/or may comprise at least one criterion allowing said device registry to obtain profiles matching said at least one criterion from said storage facility.

According to the invention, the third object is realized in that the device for transmitting information comprises at least one transmitter and a processor configured to obtain at least one profile from at least one device registry, said at least one profile comprising at least one identifier of at least one wireless device connected to at least one mobile device and said at least one profile enabling said device for transmitting information to transmit information to said at least one mobile device, and to use said at least one transmitter and said at least one profile to transmit information to said at least one mobile device, said information comprising at least one identifier of at least one wireless device connected to a mobile device to which said information is transmitted and further comprising at least one of data and a request.

Said processor of said device for transmitting information may be configured to obtain said at least one profile corresponding to at least one identifier and/or matching at least one criterion from said device registry. Although the request may be for all profiles in device registry, this is not always desirable. A device may want to transmit information only to specific wireless devices or to a specific category of wireless devices, for example. If a single device registry is used for multiple services, e.g. for multiple games, a device for transmitting information may only want to obtain profiles relevant for one of these services, for example.

According to the invention, the fourth object is realized in that the wireless device comprises a transmitter and a processor configured to use said transmitter to connect to a mobile device and to use said transmitter to transmit device registry information to said mobile device, said device registry information allowing said mobile device to determine at least one address of at least one device registry, said at least one device registry being used for transmitting information to a plurality of wireless devices. The device registry may also be used to transmit information to wired devices.

According to the invention, the fifth object is realized in that the method of connecting to a wireless device comprises the steps of using at least one receiver to determine that a wireless device has newly connected to a mobile device, storing or updating a profile corresponding to said wireless device on a storage means, using at least one transmitter to transmit first information to at least one device registry, said first information comprising an identifier of said wireless device, using said at least one receiver to determine that a status of said wireless device has changed to a new status, updating or removing said profile stored on said storage means if said status of said wireless device has changed to said new status, and using said at least one transmitter to transmit second information to said at least one device registry if said status of said wireless device has changed to said new status, said second information comprising said identifier of said wireless device and said new status. Said method may be performed by software running on a programmable device. This software may be provided as a computer program product.

The method may further comprise the step of using an identifier of said wireless device to determine at least one address of said at least one device registry from associations between wireless devices and device registries stored on said storage means.

The method may further comprise the step of using an identifier of said wireless device to determine whether to transmit said second information to said at least one device registry from associations between wireless devices and device registries stored on said storage means.

The step of using said at least one receiver to determine that a status of said wireless device has changed to a new status may comprise using said at least one receiver to determine that said wireless device is no longer connected to said mobile device, said step of updating or removing said profile stored on said storage means if said status of said wireless device has changed to said new status may comprise updating or removing said profile stored on said storage means if said wireless device is no longer connected to said mobile device, and the step of using said at least one transmitter to transmit second information to said at least one device registry if said status of said new wireless device has changed to said new status may comprise using said at least one transmitter to transmit said second information to said device registry if said wireless device is no longer connected to said mobile device, said new status of said second information informing said at least one device registry that said wireless device is no longer connected to said mobile device.

The method may further comprise the steps of using said at least one receiver to receive information from a device for transmitting information, said information comprising an identifier of a wireless device and further comprising at least one of data and a request, determining from profiles stored on said storage means whether said wireless device is currently connected to said mobile device, and using said at least one transmitter to transmit said at least one of said data and said request to said wireless device if said wireless device is determined to be currently connected to said mobile device.

The method may further comprise the steps of using said at least one receiver to receive registry information from said wireless device and determining at least one address of at least one of said at least one device registry based on said registry information.

The method may further comprise the step of allowing at least one of a user of said mobile device and an application running on said mobile device to associate said wireless device with an identifier of at least one of said at least one device registry, said identifier comprising an address of said at least one of said at least one device registry or allowing said mobile device to obtain an address of said at least one of said at least one device registry.

The method may further comprise the step of allowing at least one of a user of said mobile device and an application running on said mobile device to specify which devices are allowed to send information to said wireless device.

Said at least one transmitter may be configured to transmit said first information and said second information over a cellular communication network.

According to the invention, the sixth object is realized in that the method of registering wireless devices comprises the steps of using at least one receiver to receive first information from a mobile device, said first information comprising an identifier of a wireless device connected to said mobile device, storing or updating a profile comprising said identifier of said wireless device on a storage facility, said profile enabling a device for transmitting information to transmit information to said mobile device, using said at least one receiver to receive a request from a device for transmitting information, said request requesting transmission of at least part of at least one profile to said device for transmitting information, obtaining said at least one profile from said storage facility, using at least one transmitter to transmit said at least part of said at least one profile to said device for transmitting information, using said at least one receiver to receive second information from said mobile device, said second information comprising said identifier of said wireless device connected to said mobile device and a new status of said wireless device, and updating or removing said profile stored on said storage facility upon receiving said second information. Said method may be performed by software running on a programmable device. This software may be provided as a computer program product.

According to the invention, the seventh object is realized in that the method of transmitting information comprises the steps of obtaining at least one profile from at least one device registry, said at least one profile comprising at least one identifier of at least one wireless device connected to at least one mobile device and enabling a device for transmitting information to transmit information to said at least one mobile device, and using at least one transmitter and said at least one profile to transmit information to said at least one mobile device, said information comprising at least one identifier of at least one wireless device connected to a mobile device to which said information is transmitted and further comprising at least one of data and a request. Said method may be performed by software running on a programmable device. This software may be provided as a computer program product.

Said step of obtaining at least one profile from at least one device registry may comprise obtaining at least one profile corresponding to at least one identifier and/or matching at least one criterion from said device registry.

According to the invention, the eighth object is realized in that the method of connecting to a mobile device comprises the steps of using a transmitter to connect to a mobile device and using said transmitter to transmit device registry information to said mobile device, said device registry information allowing said mobile device to determine at least one address of at least one device registry, said at least one device registry being used for transmitting information to a plurality of wireless devices. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: using at least one receiver to determine that a wireless device has newly connected to a mobile device, storing or updating a profile corresponding to said wireless device on a storage means, using at least one transmitter to transmit first information to at least one device registry, said first information comprising an identifier of said wireless device, using said at least one receiver to determine that a status of said wireless device has changed to a new status, updating or removing said profile stored on said storage means if said status of said wireless device has changed to said new status, and using said at least one transmitter to transmit second information to said at least one device registry if said status of said wireless device has changed to said new status, said second information comprising said identifier of said wireless device and said new status.

The same or a different non-transitory computer-readable storage medium stores at least one software code portion, the software code portion, when executed or processed by a computer, being configured to perform executable operations comprising: using at least one receiver to receive first information from a mobile device, said first information comprising an identifier of a wireless device connected to said mobile device, storing or updating a profile comprising said identifier of said wireless device on a storage facility, said profile enabling a device for transmitting information to transmit information to said mobile device, using said at least one receiver to receive a request from a device for transmitting information, said request requesting transmission of at least part of at least one profile to said device for transmitting information, obtaining said at least one profile from said storage facility, using at least one transmitter to transmit said at least part of said at least one profile to said device for transmitting information, using said at least one receiver to receive second information from said mobile device, said second information comprising said identifier of said wireless device connected to said mobile device and a new status of said wireless device, and updating or removing said profile stored on said storage facility upon receiving said second information.

The same or a different non-transitory computer-readable storage medium stores at least one software code portion, the software code portion, when executed or processed by a computer, being configured to perform executable operations comprising: obtaining at least one profile from at least one device registry, said at least one profile comprising at least one identifier of at least one wireless device connected to at least one mobile device and enabling a device for transmitting information to transmit information to said at least one mobile device, and using at least one transmitter and said at least one profile to transmit information to said at least one mobile device, said information comprising at least one identifier of at least one wireless device connected to a mobile device to which said information is transmitted and further comprising at least one of data and a request.

The same or a different non-transitory computer-readable storage medium stores at least one software code portion, the software code portion, when executed or processed by a computer, being configured to perform executable operations comprising: using a transmitter to connect to a mobile device and using said transmitter to transmit device registry information to said mobile device, said device registry information allowing said mobile device to determine at least one address of at least one device registry, said at least one device registry being used for transmitting information to a plurality of wireless devices.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
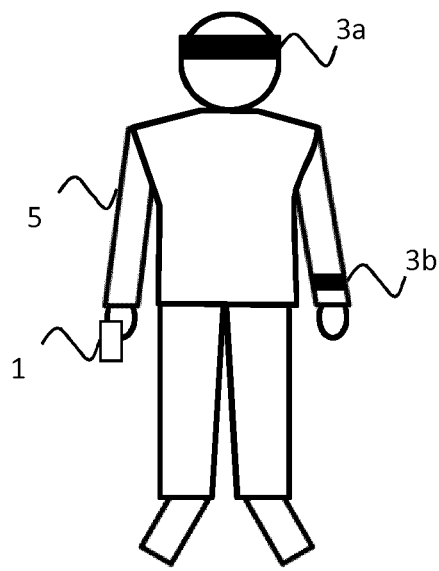
FIG. 1 shows a person wearing wireless devices and carrying a mobile device of the invention.

The invention relates to a mobile device 1 and at least one wireless device connected to the mobile device 1. The wireless device may be a wearable device, for example. FIG. 1 shows two wearable devices connected to the mobile device 1: virtual reality glasses 3a and a smart watch 3b. The wearable devices are worn by a person 5. Other examples of wearable devices are augmented reality glasses, earphones, a hearing aid, a glucose sensor, a body temperature sensor, a blood pressure sensor, an insulin pump, a heart rate sensor, a GPS sensor and an accelerometer. A mobile device and wearable devices connected to it are often called a Body Area Network (BAN).

Alternatively, wireless devices may be other devices communicating with a mobile device. A wireless device may be a car that connects to the mobile device of the driver, for example. Or the wireless device may be a device nearby the mobile device, e.g. a light sensor, a home control device, a (HiFi) music streaming device, or a TV. The wireless device may also be a device that the user may carry, use or interact with only occasionally and are connected to his/her mobile device only occasionally, e.g. a game console, a wireless toy, a wireless keyboard, a tablet, a screen, a beamer, or a musical instrument. The wider set of mobile device and wireless devices that are connected to it are often called a Personal Area Network (PAN).

Figure 2:
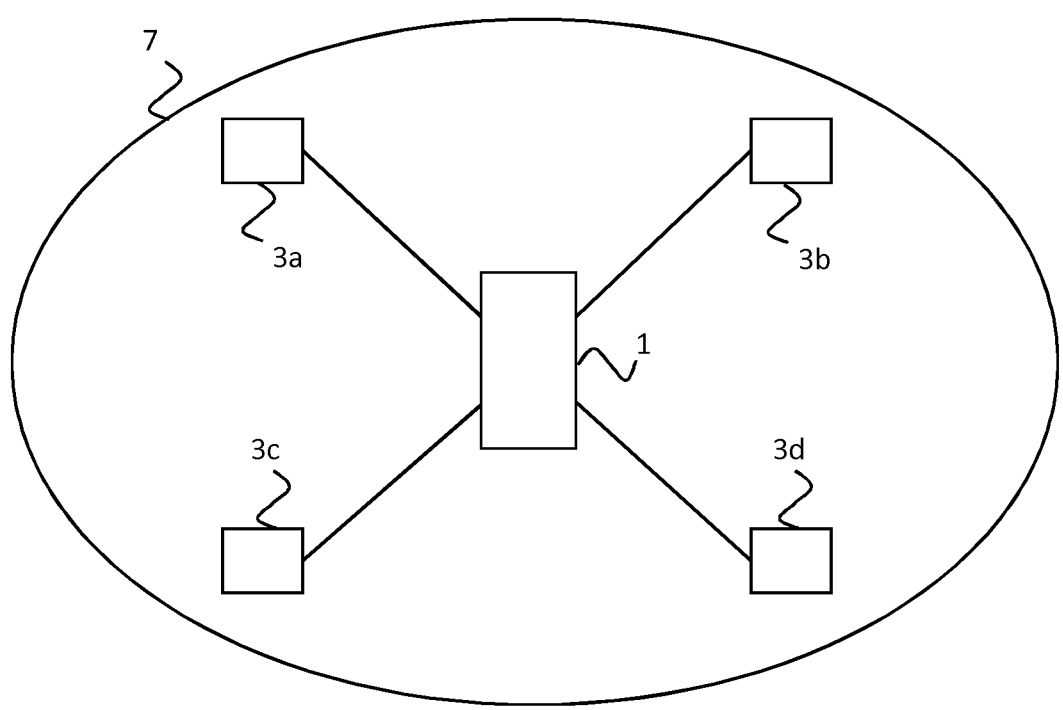
FIG. 2 is a block diagram of a body/personal area network comprising the devices of FIG. 1.

FIG. 2 shows a schematic representation of a BAN or PAN 7. Like the virtual reality glasses 3a and the smart watch 3b, a third wireless device 3c and a fourth wireless device 3d are also connected to the mobile device 1. All these wireless devices may use the same wireless technology to connect to the mobile device 1, but some or all of these wireless devices may also use different wireless technologies. Examples of existing wireless technologies that can be used are Bluetooth (Low Energy), ZigBee and Near Field Communication (NFC). In the future, it may be possible to use wireless technologies such as LTE Proximity Services (including LTE D2D), for example.

Figure 3:
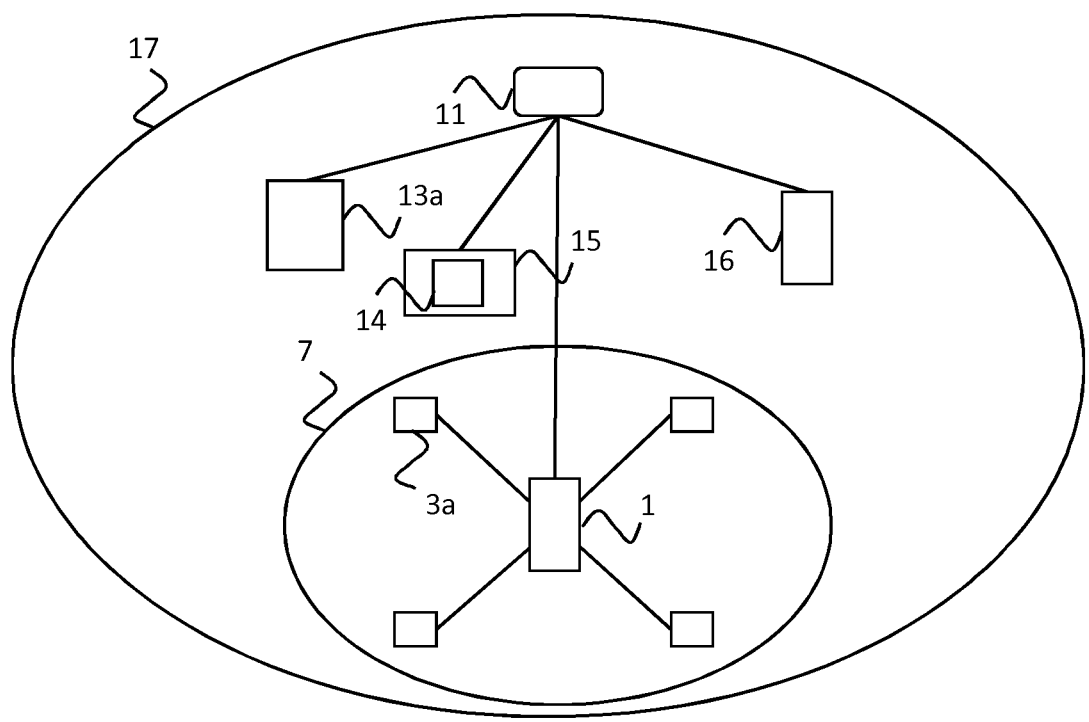
FIG. 3 is a block diagram of a first embodiment of the system of the invention.

The wireless devices 3a-d can only communicate over short range or prefer communicating over short range. In order to allow them to receive information, e.g. (service) data and/or requests, this information is routed via the mobile device 1. FIG. 3 shows a first embodiment of the system of the invention in which a LAN terminal 13a wants to transmit information relating to a certain service, e.g. a certain game, to the virtual reality glasses 3a. In order to determine which wearable devices want to or are able to receive information, the LAN terminal 13a consults a device registry 14 hosted on a device 15. In this embodiment, the device 15 hosting the device registry 14 is located in the same local area network (LAN) 17 as the mobile device 1 and the LAN terminal 13a. The LAN 17 further comprises a further mobile device 16. The mobile device 1, the LAN terminal 13a, the device 15 hosting the device registry 14 and the further mobile device 16 are all connected to a network switch/router 11. The mobile device 1 and the network switch/router 11 may communicate via Wi-Fi, for example.

Figure 4:
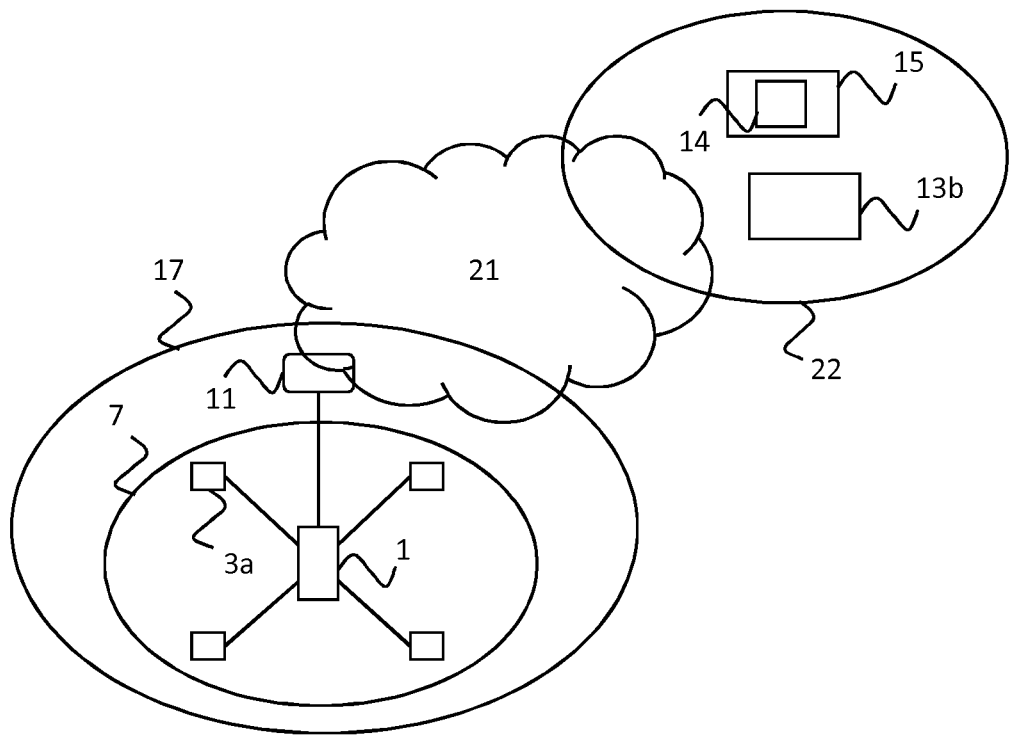
FIG. 4 is a block diagram of a second embodiment of the system of the invention.

In the second embodiment of the system of the invention shown in FIG. 4, a server 13b wants to transmit information relating to a certain service to the virtual reality glasses 3a. Both the server 13b and the device 15 hosting the device registry 14 are located somewhere else on the Internet in a LAN 22. The LAN 17 and the LAN 22 are connected to each other via Internet backbone 21. The LAN 17 is connected to the Internet backbone 21 via network switch/router 11. A similar network switch/router is present in LAN 22 (not shown).

Figure 5:
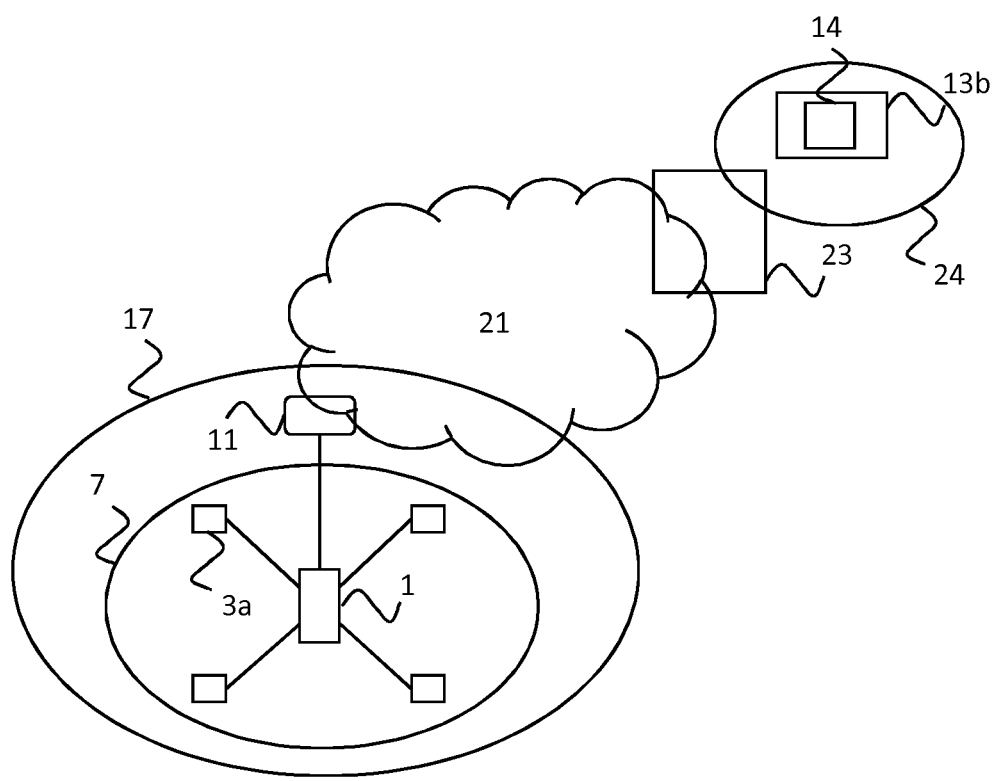
FIG. 5 is a block diagram of a third embodiment of the system of the invention.

In the third embodiment of the system of the invention shown in FIG. 5, the server 13b is part of a cellular communication network 24. The cellular communication network 24 is connected to the Internet backbone 21 via a mobile network operator (MNO) Gateway 23. Furthermore, in this embodiment, there is no separate device 15 hosting the device registry 14, but the device registry 14 has been installed on the server 13b instead.

Figure 6:
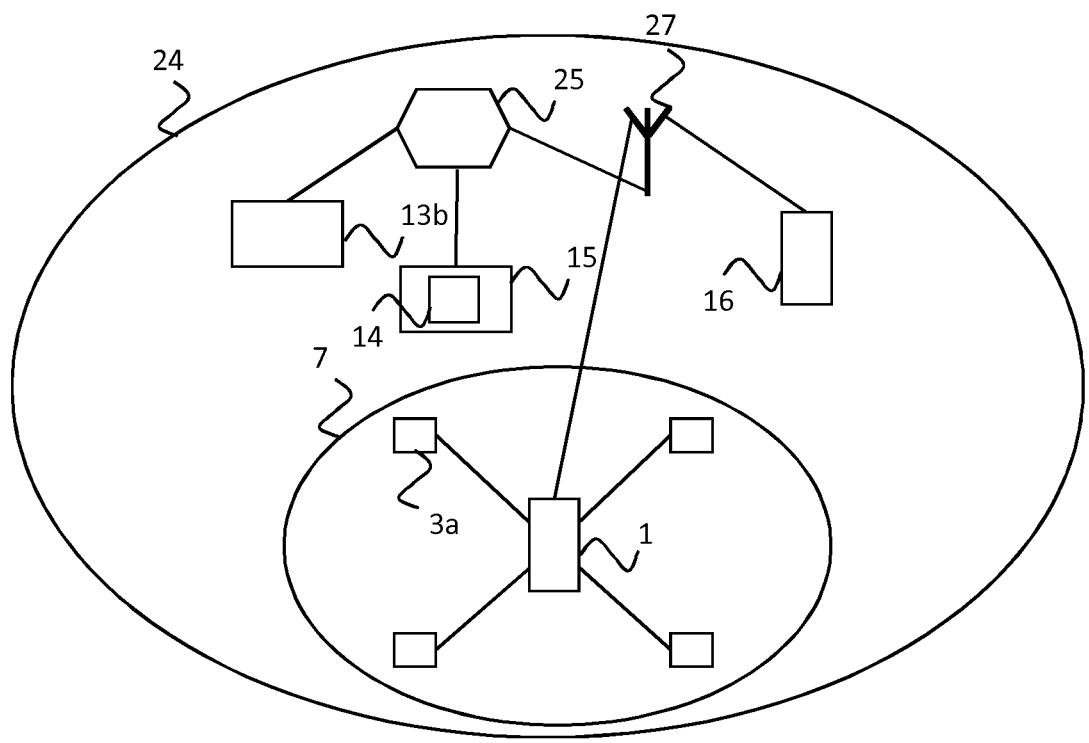
FIG. 6 is a block diagram of a fourth embodiment of the system of the invention.

In the fourth embodiment of the system of the invention shown in FIG. 6, not only the server 13b is part of the cellular communication network 24, but also the mobile device 1, the server 13b, the device 15 hosting the device registry 14 and the further mobile device 16 are part of the cellular communication network 24. The mobile device 1 and the further mobile device 16 connect to the cellular communication network 24 via a base station 27. The server 13b and the device 15 hosting the device registry 14 connect to the cellular communication network 24 via a gateway/router 25, e.g. a Packet Data Network (PDN) Gateway.

The mobile device 1 may have a formal identity in the cellular communication network 24. The mobile device 1 may e.g. comprise an International Mobile Equipment Identity (IMEI), an International Mobile Subscriber Identity (IMSI) or an MSISDN. The mobile device 1 may comprise a Subscriber Identity Module, (SIM), UMTS Subscriber Identity Module (USIM) or IMS Subscriber Identity Module (ISIM). The mobile device 1 may also comprise a secure storage space for identity credentials, such as the Universal Integrated Circuit Card (UICC). The mobile device 1 may comprise a 3G/4G/5G radio interface.

Figure 7:
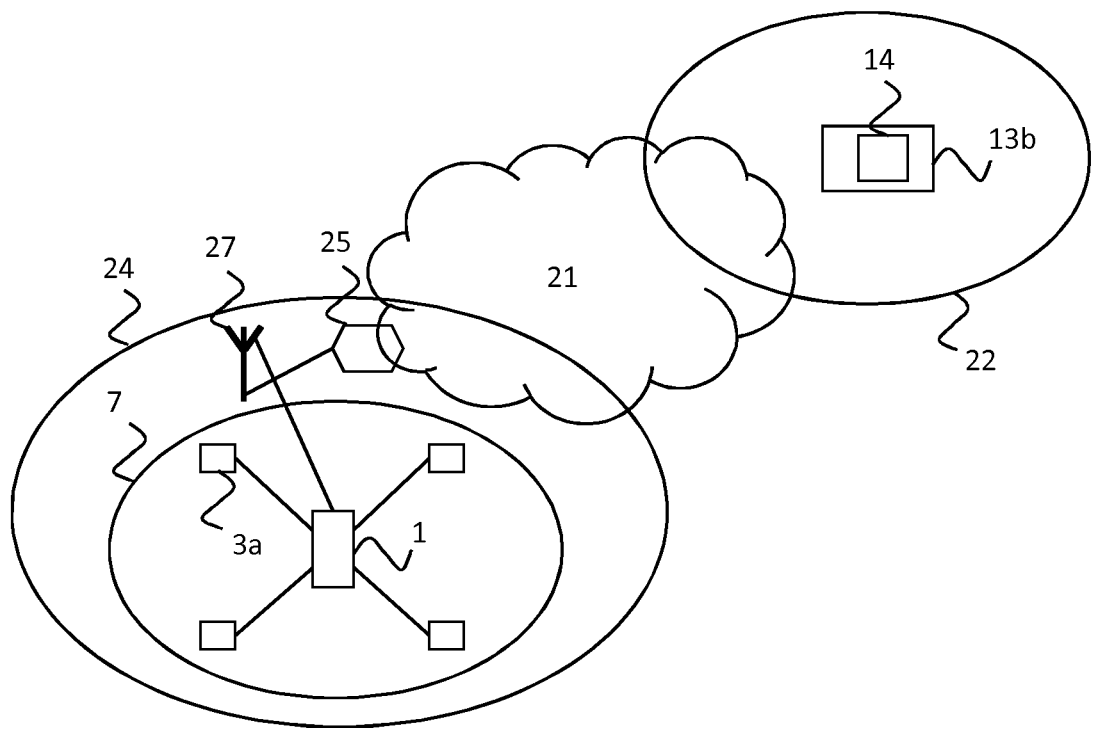
FIG. 7 is a block diagram of a fifth embodiment of the system of the invention.

FIG. 7 shows a fifth embodiment of the system of the invention. In the embodiment of FIG. 7, the device registry 14 has been installed on the server 13b. Furthermore, the server 13b is part of LAN 22, like in the second embodiment shown in FIG. 4. However, instead of being part of LAN 17 and connecting to the Internet backbone 21 via network switch/router 11, the mobile device 1 connects to the base station 27 of the cellular communication network 24, like in the fourth embodiment shown in FIG. 6.

Figure 8:
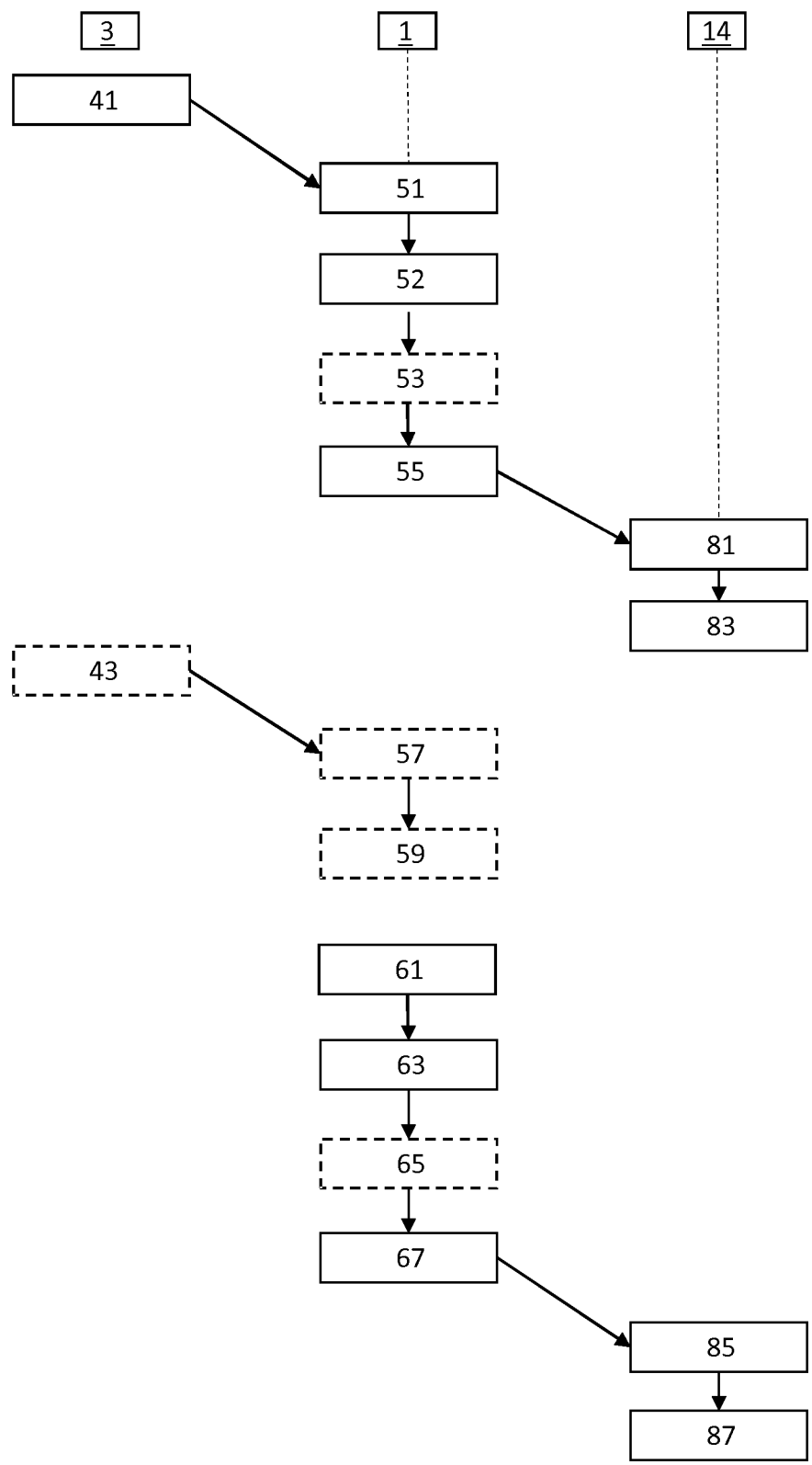
FIG. 8 is a flow diagram of an embodiment of the method of registering wireless devices of the invention.

The flow diagram of FIG. 8 illustrates how wireless device 3 is registered in a device registry 14 by the mobile device 1. A step 41 comprises the wireless device 3 using its transmitter to connect to the mobile device 1. A step 51 comprises the mobile device 1 using its receiver(s) to determine that the wireless device 3 has newly connected to the mobile device 1, e.g. by receiving and accepting a connection request of the wireless device 3. A step 52 comprises the mobile device 1 storing or updating a profile corresponding to the wireless device 3 on a storage means (e.g. updating if the profile already exists and storing otherwise).

After an optional step 53, a step 55 comprises the mobile device 1 using its transmitter(s) to transmit first information to the device registry 14, the first information comprising an identifier of the wireless device 3. A step 81 comprises the (device hosting the) device registry 14 using its receiver(s) to receive the first information from the mobile device 1. A step 83 comprises the (device hosting the) device registry 14 storing or updating a profile (e.g. updating if the profile already exists and storing otherwise) comprising the identifier of the wireless device 3 on a storage facility, the profile enabling a device for transmitting information to transmit information to the mobile device 1. The profile can also include other types of information, e.g. service discovery information (e.g. what capabilities, services, measurement data can the wireless device 3 provide) and status information (e.g. what is the temperature or are the lights on). This type of information may be requested from the wireless device 3 by a device after using the device registry 14, but it may also be the mobile device 1 that receives this information from the wireless device 3 and forwards it to the device registry 14, which stores it in the profile.

The profile may comprise an identifier of the mobile device 1, which enables the device for transmitting information to communicate with the mobile device 1. The device registry 14 may receive this identifier from the mobile phone 1 as part of the first information or may be able to derive it from the received first information, e.g. from headers or trailers added by other network components. Alternatively or additionally, the identifier of the wireless device 3 may be unique. This allows the same profile to be used and the wireless device 3 to be found independent of which mobile device 1 it is connected to. For example, if a service wants to send data/requests to a particular heart rate monitor, it may want to do this independently of which mobile device this heart rate monitor is connected to. The heart rate monitor may be provided with a unique ID to make this possible.

The unique identifier of the wireless devices 3 may, for example, take the form of a cellular network identifier such as an IMSI (e.g. including a Mobile Country Code (MCC), and Mobile Network Code (MNC)) or MSISDN (e.g. including a Country Code) or may take the form of an IP/Internet based identifier/name (e.g. Uniform Resource Identifier—URI). When the wireless device 3 connects to the mobile device 1, the mobile device 1 will send an update to the device registry 14. This update will include the unique identifier of the wireless device 3 and preferably an identifier of the mobile device 1. The device registry 14 may be a HSS (Home Subscriber Server) from an operator/service provider that provides a subscription to the wireless device 3, for example. The mobile device 1 may determine the address of the device registry 14 based on the identifier of the wireless device 3 (e.g. based on the MCC+MNC or based on the domain name in the URI). In an embodiment, signaling procedures are used to send the update. For example, an LTE mobile phone may send the update in a Non-Access Stratum (NAS) signaling message to a Mobility Management Entity (MME) in the Evolved Packet Core. The MME will then use signaling procedures to further route the update to the device registry 14 for the wireless device 3, e.g. using similar procedures as used in the mobile network for routing area updates. The MCC and MNC or a domain name can be used to find, and route to a particular HSS.

When a device 13 for transmitting information, e.g. a server, wants to know how to contact a particular wireless device 3 (not knowing which mobile device 1 it is connected to), it will send a request that includes the unique identifier of the wireless device 3 to the device registry 14 of the wireless device 3. The device 13 may first resolve (e.g. the MCC+MNC or the domain name included in) the unique identifier to find an address for the device registry 14 of the wireless device 3. The device 13 may use a DNS server to resolve (part of) a URI of the wireless device 3, for example. For instance, when the URI of a wireless device 3 is "abc.xyz.com", the device 13 may use a DNS server to find the IP address of a device registry 14 for the domain "xyz.com", or find the IP address of a device registry 14 with the name "registry.xyz.com". The device 13 may alternatively or additionally use signaling procedures to find the device registry 14 of the wireless device 3 (e.g. using an MME to route the request).

After optional steps 43, 57 and 59, a step 61 comprises the mobile device 1 using its receiver(s) to determine that a status of the wireless device 3 has changed to a new status. A step 63 comprises the mobile device 1 updating or removing the profile stored on the storage means if the status of the wireless device 3 has changed to the new status. For example, the mobile device 1 may remove the profile if the wireless device 3 is determined to no longer be connected. Alternatively, the mobile device 1 may wait with removing the profile until the wireless device 3 has not connected to the mobile device 1 for a certain period of time or until the user removes the profile manually, for example. Or the mobile device 1 may never remove the profile, for example. After an optional step 65, a step 67 comprises the mobile device 1 using its transmitter(s) to transmit second information to the device registry 14 if the status of the wireless device 3 has changed to the new status, the second information comprising the identifier of the wireless device 3 and the new status. A step 85 comprises the (device hosting the) device registry 14 using its receiver(s) to receive the second information from the mobile device. A step 87 comprises the (device hosting the) device registry 14 updating or removing the profile stored on the storage facility upon receiving the second information. If the new status informs the device registry 14 that the wireless device 3 is no longer connected to the mobile device 1, the profile may be updated with the status "disconnected" or the profile may be removed (and created again when the wireless device 3 reconnects), for example. Steps 61, 63, 67, 85 and 87 and optionally step 65 may be repeated multiple times, e.g. third information, fourth information, etc. may be transmitted by the mobile device 1 to the device registry 14.

The new status may relate to any parameter associated with the wireless device 3. The status may for example relate to a connection state of the wireless device 3 indicating a state of the connection with the mobile device 1, or to an operational state, such as "on" or "off", or to an aspect that is specific to the wireless device 3, such as the temperature of a refrigerator, the heart rate of a person wearing a heart rate monitor, or the volume of a sound system, or a state of a sensor device of a security system, e.g. "motion detected" or "door opened". Other examples of statuses are whether a lamp is switched on or off or the pre-programmed washing cycle of a washing machine. A status may also indicate control/service options for the wearable device 3, for example parameters/switches that can be set or controlled, e.g. whether the device has volume control, or whether the hue of a light can be controlled, the intensity of the light can be dimmed, whether a toy car has a horn that can be sounded, or whether a lamp can only be switched on/off. The control/service options may change over time. For example, not all options on a washing machine are operational when it is washing. Another example is that a Smart Television might be indicated as a PVR (in addition to being indicated as a television) once a hard disk that it can use to record television broadcasts is connected to a USB port. The control/service options may thus be part of the status.

In an embodiment, the device registry 14 is not (always) informed by the mobile device 1 when the mobile device 1 determines that the wireless device 3 is no longer connected to the mobile device 1. Instead, the mobile device 1 keeps sending information to the device registry 14 for connected wireless devices at a regular interval (e.g. after polling connected wireless devices regularly to see if they are still connected). If the wireless device 3 is no longer connected, the information will no longer be sent to the device registry 14. The mobile device 1 and the device registry 14 may delete information if they have become 'stale' (i.e. are not refreshed recently).

Optional step 43 comprises the wireless device 3 using its transmitter to transmit device registry information to the mobile device 1. The device registry information allows the mobile device 1 to determine the address of the device registry 14. The device registry information may comprise an address of the device registry 14 or an identifier of the wireless device 3, for example. The identifier of the wireless device 3 may comprise a domain name or other part that can be resolved by the mobile device 1 into an address of the device registry 14 by using a DNS server for example. Optional step 57 comprises the mobile device 1 receiving the device registry information from the wireless device 3. The mobile device 1 determines the address of the device registry 14 based on the registry information. The mobile device 1 may perform this determination in step 57 or in a later step. Optional step 59 comprises the mobile device 1 storing at least part of the device registry information on its storage means, e.g. in the stored profiles.

Optional step 53 comprises the mobile device 1 using the identifier of the wireless device 3, e.g. a device ID provided by the wireless device 3, to determine the address(es) of the desired device registry or registries, i.e. of device registry 14 in this case, from associations between wireless devices and device registries stored on the storage means. These associations may have been stored in step 59 or may have been configured by the user of the mobile device 1, for example. Optional step 53 may be performed between steps 52 and 55, for example. Optional step 65 comprises the mobile device 1 using the identifier of the wireless device 3 to determine whether to transmit the second information to the device registry 14 from the associations between wireless devices and device registries stored on the storage means. Optional step 65 may be performed between steps 63 and 67, for example.

Figure 9:
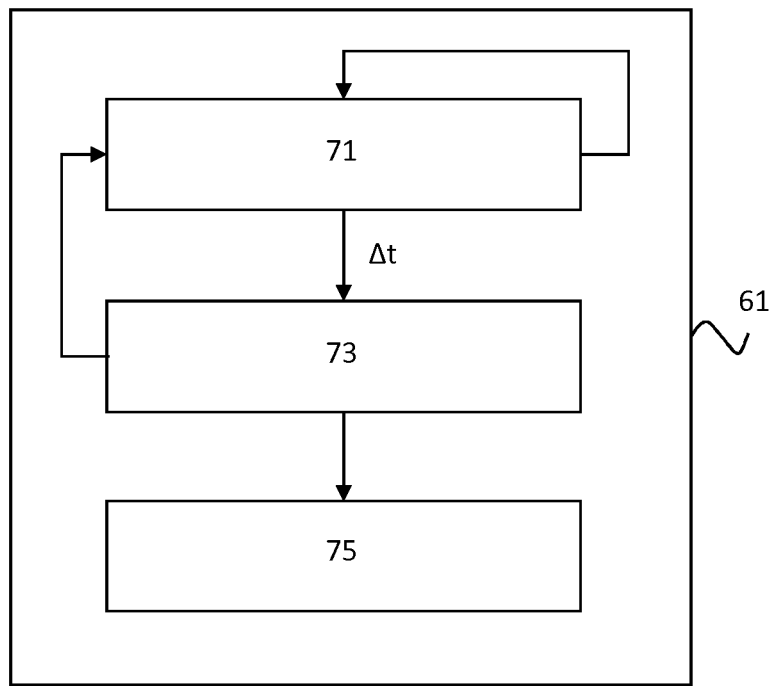
FIG. 9 is a flow diagram of an embodiment of one of the steps of FIG. 8.

Step 61 may comprise three sub steps, see FIG. 9. A sub step 71 comprises the mobile device 1 using its receiver(s) to regularly sense activity of connected wireless devices, wireless device 3 in this case, on one or more radio channels and/or to poll the connected wireless devices and check whether they respond. A sub step 73 comprises checking whether activity has been sensed and/or information has been received recently, e.g. in a certain time period Δt. The wireless device 3 is determined to no longer be connected to the mobile device 1 in sub step 75 if no activity has been sensed and/or information has been received recently in relation to the wireless device 3. If activity of the wearable device 3 was sensed and/or information, e.g. a response to a poll request, was received from the wearable device 3, sub step 71 is performed after sub step 73 instead of sub step 75.

Figure 10:
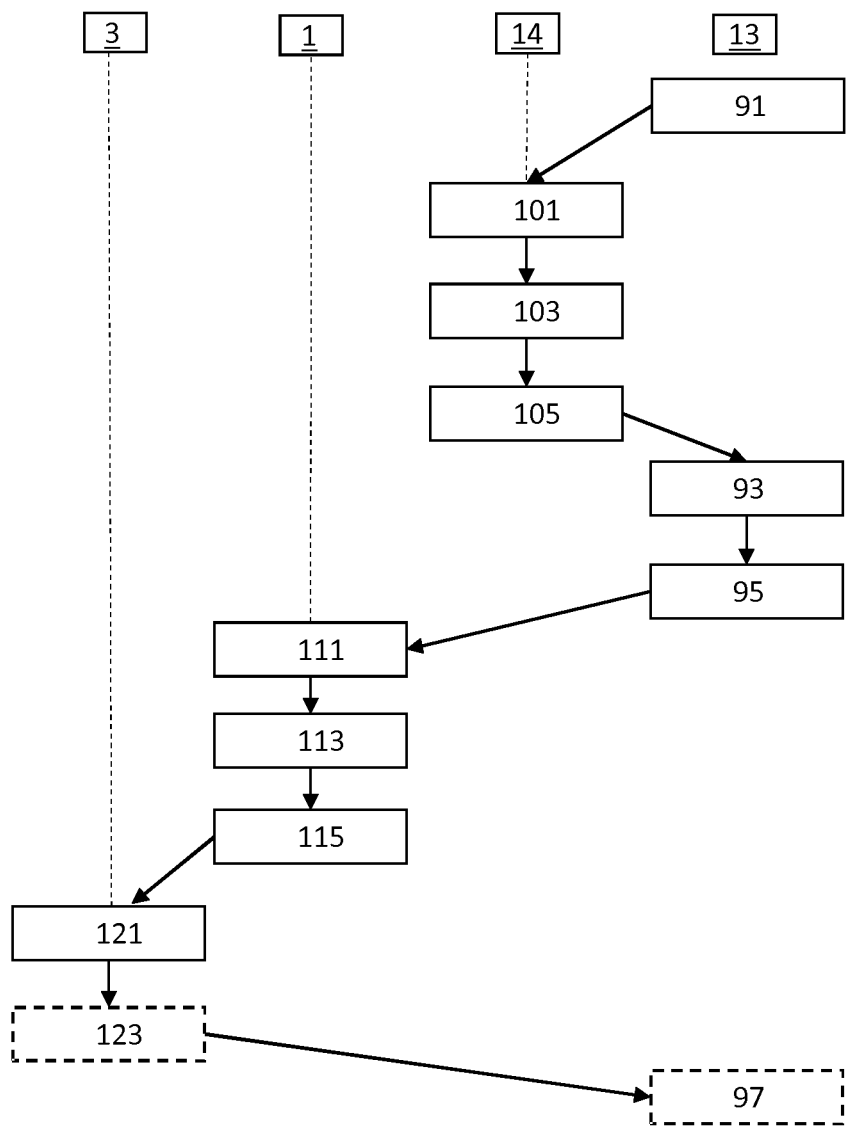
FIG. 10 is a flow diagram of an embodiment of a method of transmitting information of the invention.

The flow diagram of FIG. 10 illustrates how a device 13, e.g. a server 13*a*, transmits information to a wireless device 3, e.g. virtual reality glasses 3*a*, via a mobile device 1 by first consulting a device registry 14. Steps 91 and 93 comprise the device 13 obtaining at least part of at least one profile from the device registry 14, the at least one profile including a profile comprising an identifier of the wireless device 3 connected to the mobile device 1 and enabling a device for transmitting information to transmit information to the mobile device 1. Step 91 may comprise transmitting a request to a separate, e.g. dedicated, device 15 hosting the device registry 14 and step 93 may comprise receiving the response to this request. Alternatively or additionally, step 91 may comprise invoking a library function of the device registry 14 and step 93 may comprise receiving the results of this function call if the device registry 14 is installed on the device 13, for example. The device 13 may obtain the profile by using/providing identifiers of the profiles (e.g. identifiers of wireless devices and/or mobile devices) it wants to obtain or by using/providing at least one criterion which these profiles should match, e.g. a physical region in which wireless devices and/or mobile devices should be located.

When the device registry 14 is installed on a separate device 15, a step 101 comprises the device 15 using its receiver(s) to receive a request from the device 13, the request requesting transmission of the at least part of the at least one profile. A step 103 comprises the device 15 obtaining the at least one profile from a storage facility. A step 105 comprises the device 15 using its transmitter(s) to transmit the at least part of the at least one profile to the device 13. A step 93 comprises the device 13 using its receiver(s) to receive the at least part of the at least one profile from the device registry 14, i.e. from device 15. When the device registry 14 is installed on the device 13, function calls (and their responses) may be used instead of transmissions, for example.

A step 95 comprises the device 13 using its transmitter(s) and at least part of the profile to transmit information to the mobile device 1, the information comprising an identifier of the wireless device 3 connected to the mobile device 1 and further comprising at least one of data and a request.

A step 111 comprises the mobile device 1 using its receiver(s) to receive the information from the device 13. A step 113 comprises the mobile device 1 determining from profiles stored on the storage means whether the wireless device 3 is currently connected to the mobile device 1. A step 115 comprises the mobile device 1 using its transmitter(s) to transmit the at least one of the data and the request to the wireless device 3 if the wireless device 3 is determined to be currently connected to the mobile device 1. A step 121 comprises the wireless device 3 receiving the information from the mobile device 1. If this information comprises a request (e.g. "switch light on"), an optional step 123 comprises the wireless device 3 transmitting a response (e.g. "light is on") to the device 13 and an optional step 97 comprises the device 13 receiving the requested data from the wireless device 3.

An example of data requested by the device 13 is sensor data from a heart rate sensor that is connected as a wireless device 3 to the mobile device 1 and is remotely monitored from the device 13. Another example of data requested by the device 13 is a toy (small drone, remotely controlled car, or rollerball) that is connected as a wireless device 3 to the mobile device 1 and can be controlled using a different device (e.g. belonging to a friend of the owner of the toy). This way two remote friends can do a race with two remotely controlled cars, for example. One car would be controlled by the mobile device 1. The other car would be controlled using another mobile device. As another example, the device 13 may be a server of a manufacturer of an air-conditioning unit. If the mobile device 1 is at home, i.e. near the air-conditioning unit, the manufacturer can send firmware/software updates to the air-conditioning unit.

Figure 11:
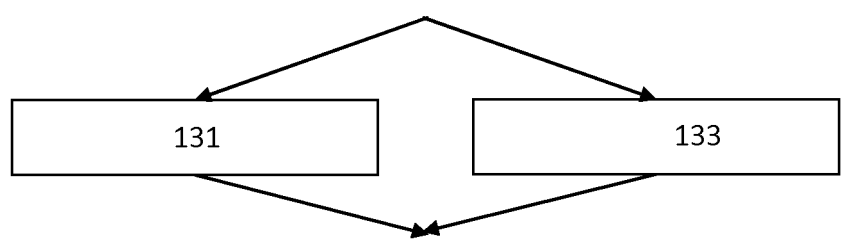
FIG. 11 is a flow diagram of an embodiment of a method of configuring the mobile device of the invention.

A user of the mobile device 1 or an application running on the mobile device 1 may be able configure the mobile device 1 in relation to the wireless device 3, See FIG. 11. A step 131 comprises the mobile device 1 allowing the user of the mobile device 1 or an application running on the mobile device 1 to associate the wireless device 3 with at least one identifier of at least one device registry, e.g. an identifier of the device registry 14, the at least one identifier comprising at least one address of the at least one device registry or allowing the mobile device to obtain at least one address of the at least one device registry. For one or more of the device registries, the user may further be able to define what information is sent to these device registries, e.g. he may not want all status information may be sent to all registries. A step 133 comprises the mobile device 1 allowing a user of the mobile device 1 or an application running on the mobile device 1 to specify which devices are allowed to transmit information to the wireless device 3. One or both of the optional steps 131 and 133 may be performed, for example. In the latter case, steps 131 and 133 may be performed in any sequence or in parallel.

Figure 12:
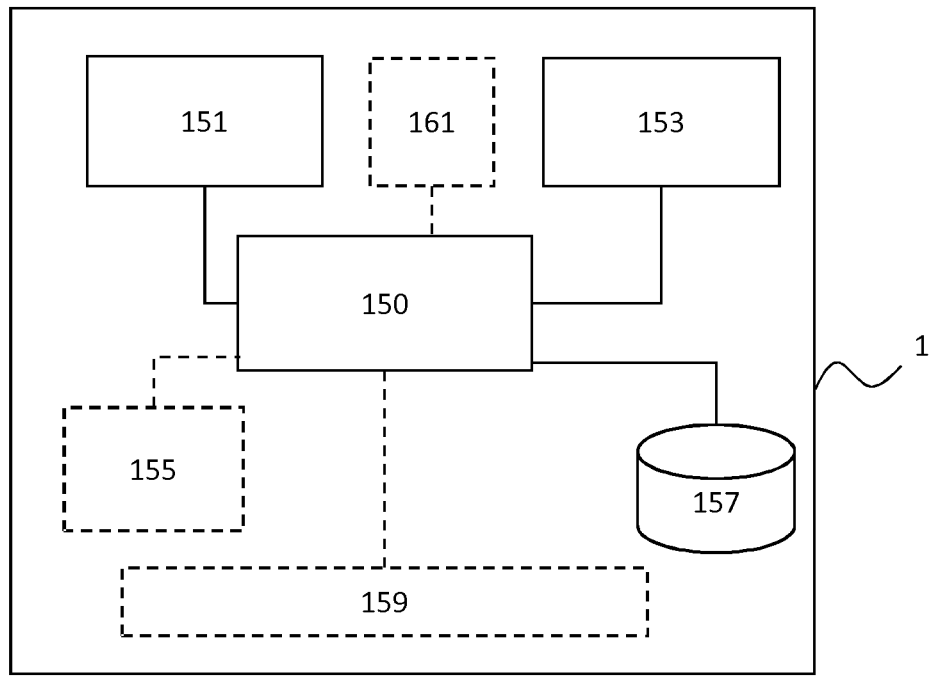
FIG. 12 is a block diagram of the mobile device of the invention.

The mobile device 1 of the invention comprises at least one receiver 151, at least one transmitter 153, storage means 157 and a processor 150, see FIG. 12. The processor 150 is configured to use the at least one receiver 151 to determine that a wireless device has newly connected to the mobile device 1, to store or update a profile corresponding to the wireless device on the storage means 157 and to use the at least one transmitter 153 to transmit first information to at least one device registry. The first information comprises an identifier of the wireless device. The processor 150 is further configured to use the at least one receiver 151 to determine that a status of the wireless device has changed to a new status, to update or remove the profile stored on the storage means if the status of the wireless device has changed to the new status, and to use the at least one transmitter 153 to transmit second information to the at least one device registry if the status of the wireless device has changed to the new status. The second information comprises the identifier of the wireless device and the new status.

The at least one receiver 151 and the at least one transmitter 153 may be combined into one transceiver. If the at least one receiver 151 comprises multiple receivers and the at least one transmitter 153 comprises multiple transmitters, they may be combined into multiple transceivers. The at least one receiver 151 and the at least one transmitter 153 may use Wireless LAN technology, e.g. Wi-Fi, or cellular communication technology, such as GPRS, CDMA, UMTS and/or LTE, to communicate with the device registry and the device for transmitting information, for example. The at least one receiver 151 and the at least one transmitter 153 may use BAN/PAN technologies such as Bluetooth (Low Energy), NFC, ZigBee and LTE Proximity Services (including LTE D2D) to communicate with the wireless devices, for example. The mobile device 1 may also comprise a random access memory 155, e.g. for temporarily storing applications and OS functions (being executed) and data used by these applications and OS functions. The mobile device 1 may also comprise a display 159. The processor 150 is preferably a general-purpose processor, e.g. an ARM or a Qualcomm processor. The processor 150 may comprise multiple cores, for example. The storage means 157 may comprise solid state memory, e.g. a Solid State Disk (SSD) made out of Flash memory, or a hard disk, for example. The mobile device 1 may comprise other components typical for a mobile device, e.g. a battery, one or more connectors for charging and data transfer, a microphone, a loudspeaker and/or a camera.

The mobile device 1 may further comprise a user input means 161. In conjunction with the display 159, the user input means 161 and the display 159 form a user interface which may allow a user of the mobile device 1 to associate the wireless device with at least one identifier of at least one of the at least one device registry. The at least one identifier comprises at least one address of the at least one of the at least one device registry or allows the mobile device 1 to obtain at least one address of the at least one of the at least one device registry. The user input means 161 may be processed, for example, by an application running on the mobile device 1, i.e. an application being executed by the processor 150. Alternatively, the application may be able to associate the wireless device with at least one identifier of at least one of the at least one device registry, i.e. to find device registries to associate with the wireless device, without using user input.

Alternatively or additionally, the user interface may allow a user of the mobile device 1 to specify which devices are allowed to transmit information to the wireless device. The at least one transmitter 151 may be configured to transmit the first information and the second information over a cellular communication network. The user input means 161 and the display 159 may be combined into one touchscreen display, for example. Alternatively, the user input means 161 may additionally or alternatively comprise physical buttons/keys.

In an embodiment, the mobile device 1 creates a table that, for each wireless device connected to it, comprises a list of identities, e.g. (including) addresses, of device registries that need to be updated. Such a list of identities can be provided by a wireless device when it connects, can be changed by the wireless device at a later stage (e.g. to accommodate a change of a device registry address) and/or can be configured by the owner of the mobile device 1 through some user interface. The latter allows the user to control which device registries are updated (e.g. for privacy concerns).

Apart from the list of identities to keep updated, the table stored on the mobile device 1 may also comprise status information. An important item in the status information table is whether the wireless device is connected to the mobile device 1 or not. Other items in the status information table may relate to the capabilities of the wireless device (e.g. type of device, color or black/white printer, firmware/software version), services the wireless device can provide or status of the wireless device itself (e.g. busy, lights on/off, temperature setting of a heater, ink levels low), or may relate to parameters that are measured/determined by the wireless device (e.g. temperature, heart rate, switch settings). Every (type of) wireless device may have a different set of items in the status information table.

For each of the registries included in the table for a particular wireless device, the table may include information on what status information will be sent to that registry. This way it may be configured on the mobile device that not all registries get all the status information available from the wireless device. For example, one registry may get only connection status information (connected/not connected) and another registry may get also temperature information.

When the wireless device connects to the mobile device 1, it may inform the mobile device 1 of its type, services it can provide and which status information items it can/will keep the mobile device informed of. This may take the form of a profile (e.g. Bluetooth Generic Attribute Profile (GATT)) or a device type (e.g. device types with related commands defined by ZigBee application layer standards) and associated application level discovery procedures. The wireless device and the mobile device 1 may also use UPnP/DNLA service discovery protocols. Other discovery procedures (including new procedures to be developed for 5G) may also be used. Which items are included in the status information table may be set automatically in dependence on the information provided by the wireless device in the discovery procedure. Which items to include in the status information table (e.g. a subset of the available items) may also be configured on the mobile device 1, e.g. via a user interface by the user of the mobile device 1 or through an application running on the mobile device 1.

The mobile device 1 will determine whether any of the values in the status information table need to be updated. Discovery protocols like Bluetooth GATT, Zigbee, UPnP support different ways in which the wireless device can inform the mobile device 1 of status changes. The wireless device may actively update the mobile device 1 when there is a status update, or may inform the mobile device 1 of its status on a regular basis. The mobile device 1 may also poll the wireless device to obtain its status, e.g. on a regular basis.

The mobile device 1 may be configured to update the device registry only when there is a significant status change, i.e. not all status changes will result in an update. What constitutes a significant status change may be configured on the mobile device 1. The mobile device 1 may be configured to send an update if a measured temperature differs more than 0.1 degree from the previously stored value, for example. This configuration may be different per wireless device and even per device registry that needs to be informed (e.g. in dependence on what status information a service using the device registry needs or is allowed to use/receive). The mobile device 1 may also be configured to send status updates regularly (e.g. every minute, every hour, or once a day). The connection status of a wireless device may be seen as one of the elements in the status information table, for example.

Figure 13:
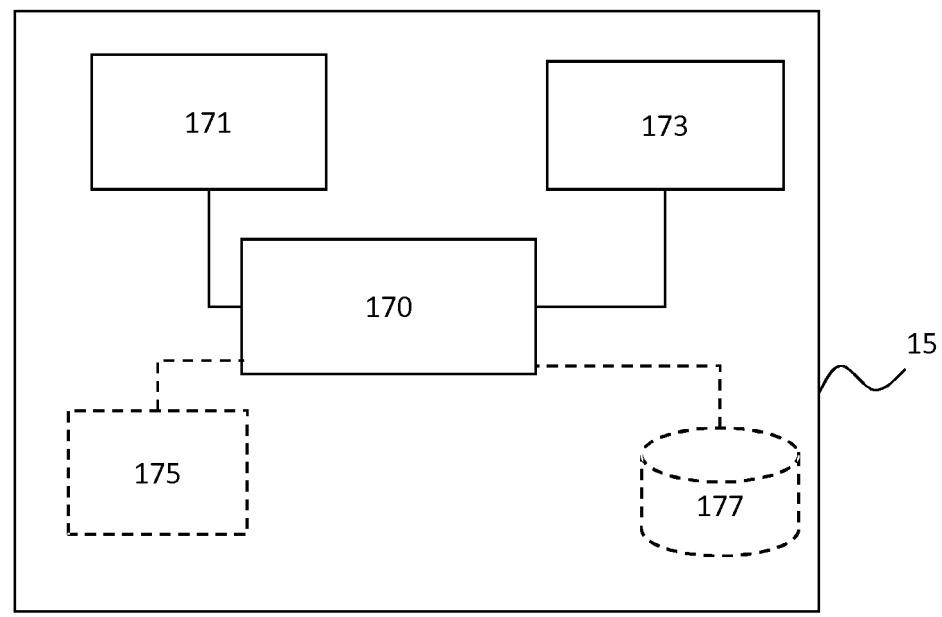
FIG. 13 is a block diagram of the device hosting the device registry of the invention.

The device 15 hosting a device registry of the invention comprises at least one receiver 171, at least one transmitter 173 and a processor 170, see FIG. 13. The processor 170 is configured to use the at least one receiver 171 to receive first information from a mobile device, the first information comprising an identifier of a wireless device connected to the mobile device, and to store or update a profile comprising the identifier of the wireless device on a storage facility 177. The profile enables a device for transmitting information to transmit information to the mobile device. The processor 170 is further configured to use the at least one receiver 171 to receive a request from a device for transmitting information, the request requesting the device registry to transmit at least part of at least one profile to the device for transmitting information, to obtain the at least one profile from the storage facility 177 and to use the at least one transmitter 173 to transmit the at least part of the at least one profile to the device for transmitting information. The processor 170 is also configured to use the at least one receiver 171 to receive second information from the mobile device, the second information comprising the identifier of the wireless device and a new status of the wireless device, and to update or remove the profile stored on the storage facility 177 upon receiving the second information. The device 15 hosting the device registry may be a Home Subscriber Server (HSS) or a Directory Network Server (DNS), for example.

The at least one receiver 171 and the at least one transmitter 173 may be combined into one transceiver. If the at least one receiver 171 comprises multiple receivers and the at least one transmitter 173 comprises multiple transmitters, they may be combined into multiple transceivers. The at least one receiver 171 and the at least one transmitter 173 may use LAN technology, e.g. Ethernet, Wireless LAN technology, e.g. Wi-Fi, or cellular communication technology, such as GPRS, CDMA, UMTS and/or LTE, to communicate (e.g. to transmit and/or receive Internet Protocol packets) with the mobile device and the device for transmitting information, for example. The device 15 may transmit IP packets to and/receive IP packets from an LTE Packet Data Network Gateway (P-GW), for example. The device 15 may also comprise a random access memory 175, e.g. for temporarily storing applications and OS functions (being executed) and data used by these applications and OS functions. The processor 170 is preferably a general-purpose processor, e.g. an Intel or an AMD processor. The processor 170 may comprise multiple cores, for example. The processor 170 may run a Unix-based or Windows operating system, for example. The storage facility 177 may comprise solid state memory, e.g. a Solid State Disk (SSD) made out of Flash memory, or a hard disk, for example. The storage facility 177 does not need to be part of the device 15. The storage facility 177 may comprise a distributed database, for example. The device 15 may be a server. The device 15 may comprise other components typical for a server, e.g. a power supply and one or more cooling fans.

Figure 14:
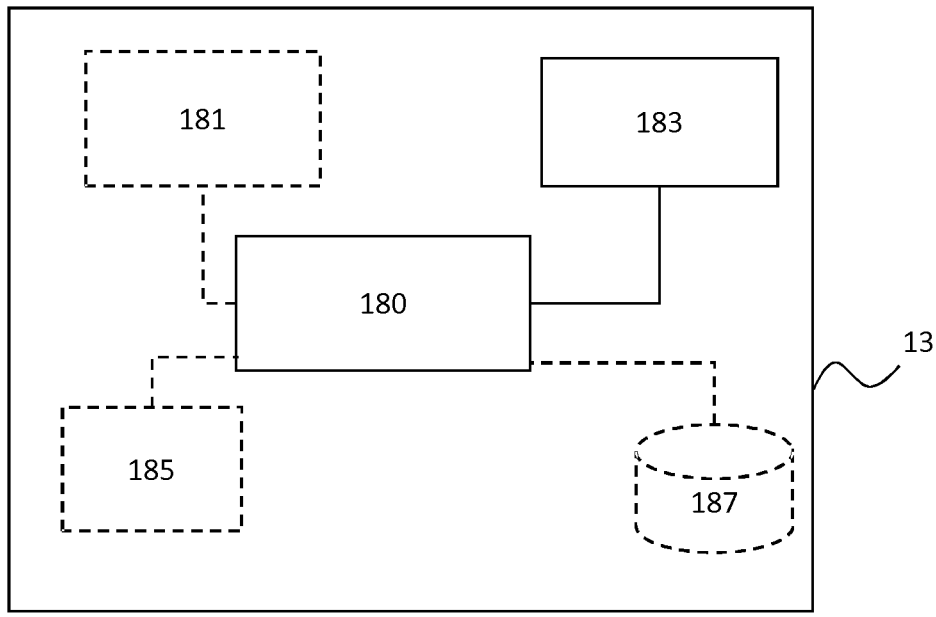
FIG. 14 is a block diagram of the device for transmitting information of the invention.

The device 13 for transmitting information of the invention comprises at least one transmitter 183 and a processor 180, see FIG. 14. The processor 180 is configured to obtain at least one profile from at least one device registry. The at least one profile comprises at least one identifier of at least one wireless device connected to at least one mobile device and the at least one profile enables the device 13 for transmitting information to transmit information to the at least one mobile device. The processor 180 is further configured to use the at least one transmitter 181 and the at least one profile to transmit information to the at least one mobile device. The information comprises at least one identifier of at least one wireless device connected to a mobile device to which the information is transmitted and further comprises at least one of data and a request.

The device 13 for transmitting information may further comprise at least one receiver 181, e.g. for receiving data from a wearable device via a mobile device. The at least one receiver 181 and the at least one transmitter 183 may be combined into one transceiver. If the at least one receiver 181 comprises multiple receivers and the at least one transmitter 183 comprises multiple transmitters, they may be combined into multiple transceivers. The at least one receiver 181 and the at least one transmitter 183 may use LAN technology, e.g. Ethernet, Wireless LAN technology, e.g. Wi-Fi, or cellular communication technology, such as GPRS, CDMA, UMTS and/or LTE, to communicate with the mobile device and the device registry (when not installed in device 13), for example. The device 13 may also comprise a random access memory 185, e.g. for temporarily storing applications and OS functions (being executed) and data used by these applications and OS functions. The device 13 may comprise storage means 187. The storage means 187 may comprise solid state memory, e.g. a Solid State Disk (SSD) made out of Flash memory, or a hard disk, for example. The device 13 may be a server, for example. The processor 180 may be a general-purpose processor, e.g. an Intel or an AMD processor, for example. The processor 180 may comprise multiple cores, for example. The processor 180 may run a Unix-based or Windows operating system, for example. The device 13 may comprise other components typical for a server, e.g. a power supply and one or more cooling fans. Alternatively the device 13 may be a mobile device and comprise components typical for a mobile device, for example.

Figure 15:
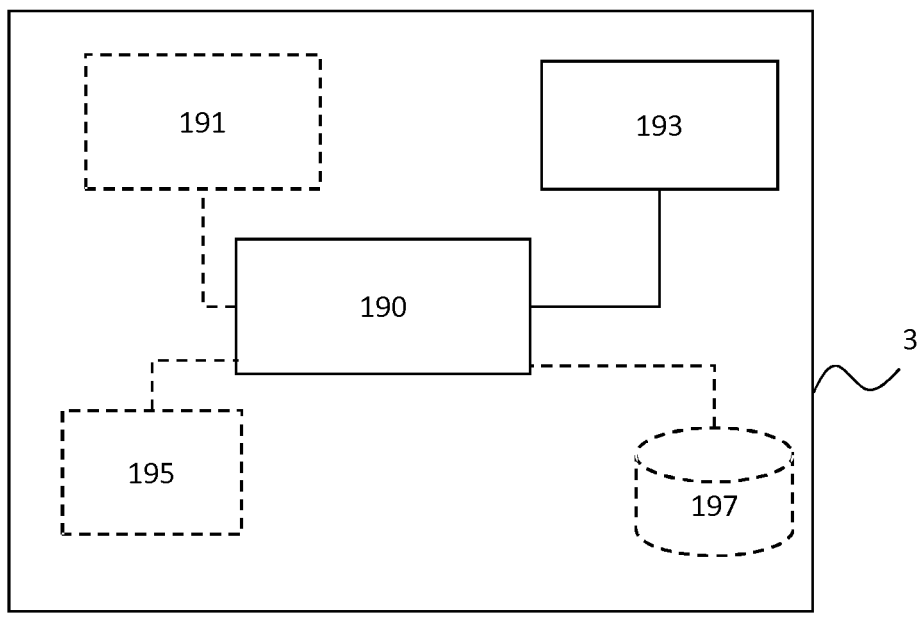
FIG. 15 is a block diagram of the wireless device of the invention.

The wireless device 3 of the invention comprises a transmitter 193 and a processor 190, see FIG. 15. The processor 190 is configured to use the transmitter 193 to connect to a mobile device and to use the transmitter 193 to transmit device registry information to the mobile device. The device registry information allows said mobile device to determine at least one address of at least one device registry. The device registry information comprises an address of a device registry and/or a wireless device identity, for example. The at least one device registry is used for transmitting information to a plurality of wireless devices.

The wireless device 3 preferably comprises a receiver 191 for receiving information via the mobile device. The receiver 191 and the transmitter 193 may be combined into one transceiver. The receiver 191 and the transmitter 193 may use BAN/PAN technologies such as Bluetooth (Low Energy), NFC, ZigBee and LTE Proximity Services (including LTE D2D) to communicate with the mobile device, for example. The wireless device 3 may also comprise a random access memory 195, e.g. for temporarily storing applications and OS functions (being executed) and data used by these applications and OS functions. The processor 190 may be a general-purpose processor, e.g. an ARM or a Qualcomm processor, or an application-specific processor. The wireless device 3 may comprise storage means 197, e.g. for storing sensor data/logs, The storage means 197 may comprise solid state memory, e.g. a Solid State Disk (SSD) made out of Flash memory, or a hard disk, for example. The wireless device 3 may be a wearable device and may comprise other components typical for a wearable device, e.g. a battery.

Figure 16:
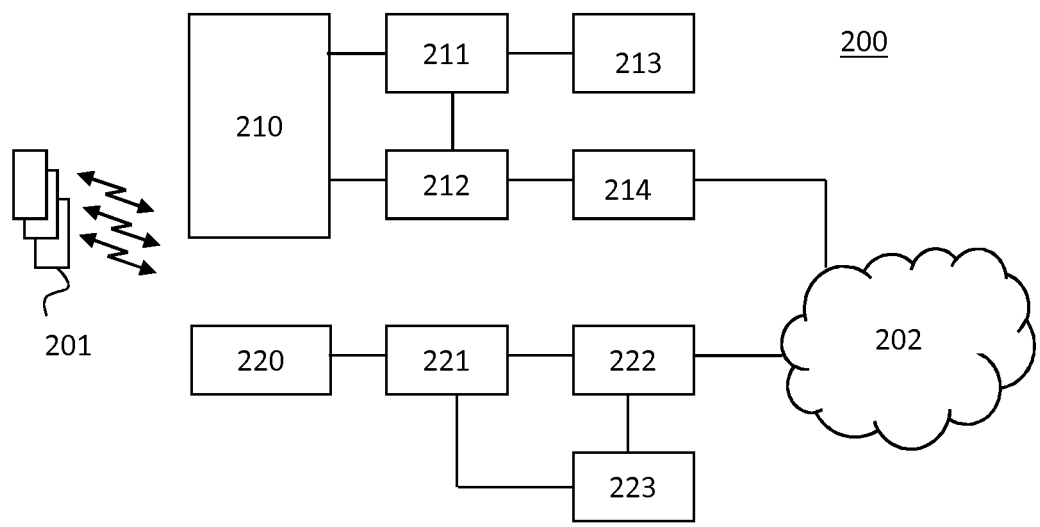
FIG. 16 is a block diagram of an exemplary cellular telecommunication system used in an embodiment of the system of the invention.

The mobile device 1, the device 13 for transmitting information and/or the dedicated device 15 hosting the device registry 14 may be part of a cellular telecommunications system, as previously described. FIG. 16 shows a schematic illustration of a cellular telecommunications system 200. The telecommunications system 200 comprises cellular radio access network systems 210 (E-UTRAN) and 220 (UT(RAN)) and a core network system containing various elements or nodes as described in further detail below.

In the telecommunications system 200 of FIG. 16, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 16 represents a GSM/GPRS or UMTS network.

For a GSM/GPRS network, a radio access network (RAN) system 220 comprises a plurality of nodes, including base stations (combination of a BSC and a BTS), not shown individually in FIG. 16. The core network system comprises a Gateway GPRS Support Node 222 (GGSN), a Serving GPRS Support Node 221 (SGSN, for GPRS) or Mobile Switching Centre (MSC, for GSM, not shown in FIG. 16) and a Home Location Register 223 (HLR). The HLR 223 contains subscription information for user devices 201, e.g. mobile stations MS.

For a UMTS radio access network (UTRAN), the radio access network system 220 also comprises a Radio Network Controller (RNC) connected to a plurality of base stations (NodeBs), also not shown individually FIG. 16. In the core network system, the GGSN 222 and the SGSN 221/MSC are connected to the HLR 223 that contains subscription information of the user devices 201, e.g. user equipment UE.

The upper branch of the telecommunications system in FIG. 16 represents a next generation network, commonly indicated as Long Term Evolution (LTE) system or Evolved Packet System (EPS).

The radio access network system 210 (E-UTRAN), comprises base stations (evolved NodeBs, eNodeBs or eNBs), not shown individually in FIG. 16, providing cellular wireless access for a user device 201, e.g. a user equipment UE. The core network system comprises a PDN Gateway (P-GW) 214 and a Serving Gateway 212 (S-GW). The E-UTRAN 210 of the EPS is connected to the S-GW 212 via a packet network. The S-GW 212 is connected to a Home Subscriber Server HSS 213 and a Mobility Management Entity MME 211 for signalling purposes. The HSS 213 includes a subscription profile repository SPR for user devices 201.

For GPRS, UMTS and LTE systems, the core network system is generally connected to a further packet network 202, e.g. the internet.

Further information of the general architecture of an EPS network can be found in 3GPP Technical Specification TS 23.401 'GPRS enhancements for Evolved Universal Terrestrial Radio Access Network (E-UTRAN) access'.

Figure 17:
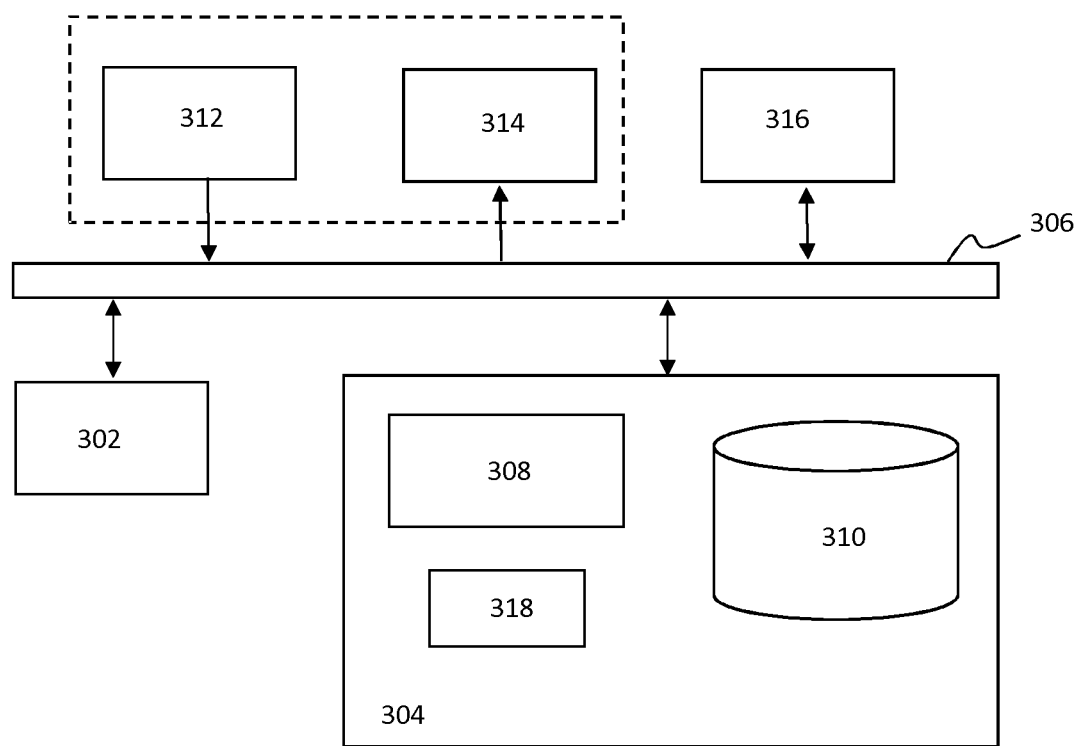
FIG. 17 is a block diagram of an exemplary data processing system for performing the methods of the invention.

FIG. 17 depicts a block diagram illustrating an exemplary data processing system that may perform the methods as described with reference to FIGS. 8 to 11.

As shown in FIG. 17, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 17 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 17, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 17) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception of being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A mobile device, comprising:
   at least one receiver;
   at least one transmitter;
   memory; and
   a processor configured to:
   use the at least one receiver to determine that a wireless device has newly connected to the mobile device;
   store or update a profile corresponding to the wireless device on the memory;
   use the at least one transmitter to transmit first information to at least one device registry, the first information comprising an identifier of the wireless device;
   use the at least one receiver to determine that a connection status indicating a state of the connection with the mobile device of the wireless device has changed to a new connection status indicating that the wireless device is no longer connected to the mobile device;
   update or remove the profile stored on the memory if the connection status of the wireless device has changed to the new connection status indicating that the wireless device is no longer connected to the mobile device;
   use the at least one transmitter to transmit second information to the at least one device registry if the connection status of the wireless device has changed to the new connection status indicating that the wireless device is no longer connected to the mobile device, the second information comprising the identifier of the wireless device and the new connection status information the at least one registry that the wireless device is no longer connected to the mobile device;
   use the at least one receiver to receive information from a device for transmitting information, the information comprising an identifier of the wireless device and further comprising at least one of data and a request;
   determine from profiles stored on the memory whether the wireless device is currently connected to the mobile device; and
   use the at least one transmitter to transmit the at least one of the data and the request to the wireless device if the wireless device is determined to be currently connected to the mobile device.

2. The mobile device as claimed in claim 1, wherein the processor is further configured to use an identifier of the wireless device to determine at least one address of the at least one device registry from associations between wireless devices and device registries stored on the memory.

3. The mobile device as claimed in claim 1, wherein the processor is further configured to use an identifier of the wireless device to determine whether to transmit the second information to the at least one device registry from associations between wireless devices and device registries stored on the memory.

4. The mobile device as claimed in claim 1, wherein the processor is further configured to use the at least one receiver to receive registry information from the wireless device and to determine at least one address of the at least one device registry based on the registry information.

5. The mobile device as claimed in claim 1, further comprising an interface configured to allow at least one of a user of the mobile device and an application running on the mobile device to associate the wireless device with at least one identifier of at least one of the at least one device registry, the at least one identifier comprising at least one address of the at least one of the at least one device registry or allowing the mobile device to obtain at least one address of the at least one device registry.

6. The mobile device as claimed in claim 1, further comprising an interface configured to allow at least one of a user of the mobile device and an application running on the mobile device to specify which devices are allowed to transmit information to the wireless device.

7. The mobile device as claimed in claim 1, wherein the at least one transmitter is configured to transmit the first information and the second information over a cellular communication network.

8. A device hosting a device registry, the device comprising:
   at least one receiver;
   at least one transmitter; and
   a processor configured to:
   use the at least one receiver to receive first information from a mobile device, the first information comprising an identifier of a wireless device connected to the mobile device;
   store or update a profile comprising the identifier of the wireless device on a storage facility, the profile enabling a device for transmitting information to transmit information to the mobile device;
   use the at least one receiver to receive a request from a device for transmitting information, the request requesting the device registry to transmit at least part of the profile to the device for transmitting information, the at least part of the profile enabling the device for transmitting information to transmit information for the wireless device to the mobile device;
obtain the at least one profile from the storage facility;
use the at least one transmitter to transmit the at least part of the at least one profile to the device for transmitting information;
use the at least one receiver to receive second information from the mobile device, the second information comprising the identifier of the wireless device and a new connection status indicating a state of the connection with the mobile device of the wireless device indicating that the wireless device is no longer connected to the mobile device; and
update or remove the profile stored on the storage facility upon receiving the second information.

9. A method for a mobile device of connecting to a wireless device, the mobile device comprising at least one receiver, a memory, and at least one transmitter, the method comprising:
using the at least one receiver to determine that the wireless device has newly connected to the mobile device;
storing or updating a profile corresponding to the wireless device on a memory;
using the at least one transmitter to transmit first information to at least one device registry, the first information comprising an identifier of the wireless device;
using the at least one receiver to determine that a connection status indicating a state of the connection with the mobile device of the wireless device has changed to a new connection status indicating that the wireless device is no longer connected to the mobile device;
updating or removing the profile stored on the memory if the connection status of the wireless device has changed to the new connection status indicating that the wireless device is no longer connected to the mobile device;
using the at least one transmitter to transmit second information to the at least one device registry if the connection status of the wireless device has changed to the new connection status indicating that the wireless device is no longer connected to the mobile device, the second information comprising the identifier of the wireless device and the new connection status informing the at least one registry that the wireless device is no longer connected to the mobile device;
using the at least one receiver to receive information from a device for transmitting information, the information comprising an identifier of the wireless device and further comprising at least one of data and a request;
determining from profiles stored on the memory whether the wireless device is currently connected to the mobile device; and
using the at least one transmitter to transmit the at least one of the data and the request to the wireless device if the wireless device is determined to be currently connected to the mobile device.

10. A method of registering wireless devices for a device hosting a device registry, the device comprising at least one receiver and at least one transmitter, the method comprising:
using the at least one receiver to receive first information from a mobile device, the first information comprising an identifier of a wireless device connected to the mobile device;
storing or updating a profile comprising the identifier of the wireless device on a storage facility, the profile enabling a device for transmitting information to transmit information to the mobile device;
using the at least one receiver to receive a request from a device for transmitting information, the request requesting transmission of at least part of the profile to the device for transmitting information, the at least part of the profile enabling the device for transmitting information to transmit information for the wireless device to the mobile device;
obtaining the at least one profile from the storage facility;
using the at least one transmitter to transmit the at least part of the profile to the device for transmitting information;
using the at least one receiver to receive second information from the mobile device, the second information comprising the identifier of the wireless device and a new connection status indicating a state of the connection with the mobile device of the wireless device indicating that the wireless device is no longer connected to the mobile device; and
updating or removing the profile stored on the storage facility upon receiving the second information.

11. A non-transitory computer readable medium having stored thereon at least one software code portion that, when executed on a computer system, causes the computing system to carry out operations for a mobile device to connect to a wireless device, the mobile device comprising at least one receiver, a memory, and at least one transmitter, the operations including:
using the at least one receiver to determine that the wireless device has newly connected to the mobile device;
storing or updating a profile corresponding to the wireless device on a memory;
using the at least one transmitter to transmit first information to at least one device registry, the first information comprising an identifier of the wireless device;
using the at least one receiver to determine that a connection indicating a state of the connection with the mobile device of the wireless device has changed to a new connection status indicating that the wireless device is no longer connected to the mobile device;
updating or removing the profile stored on the memory if the connection status of the wireless device has changed to the new connection status indicating that the wireless device is no longer connected to the mobile device;
using the at least one transmitter to transmit second information to the at least one device registry if the connection status of the wireless device has changed to the new connection status indicating that the wireless device is no longer connected to the mobile device, the second information comprising the identifier of the wireless device and the new connection status informing the at least one registry that the wireless device is no longer connected to the mobile device;
using the at least one receiver to receive information from a device for transmitting information, the information comprising an identifier of the wireless device and further comprising at least one of data and a request;
determining from profiles stored on the memory whether the wireless device is currently connected to the mobile device; and
using the at least one transmitter to transmit the at least one of the data and the request to the wireless device if the wireless device is determined to be currently connected to the mobile device.

12. A non-transitory computer readable medium having stored thereon at least one software code portion that, when executed on a computer system, causes the computing system to carry out operations for a device hosting a device registry, the device comprising at least one receiver and at least one transmitter, the operations including:
- using the at least one receiver to receive first information from a mobile device, the first information comprising an identifier of a wireless device connected to the mobile device;
- storing or updating a profile comprising the identifier of the wireless device on a storage facility, the profile enabling a device for transmitting information to transmit information to the mobile device;
- using the at least one receiver to receive a request from a device for transmitting information, the request requesting transmission of at least part of the profile to the device for transmitting information, the at least part of the profile enabling the device for transmitting information to transmit information for the wireless device to the mobile device;
- obtaining the at least one profile from the storage facility;
- using the at least one transmitter to transmit the at least part of the profile to the device for transmitting information;
- using the at least one receiver to receive second information from the mobile device, the second information comprising the identifier of the wireless device and a new connection status indicating a state of the connection with the mobile device of the wireless device indicating that the wireless device is no longer connected to the mobile device; and
- updating or removing the profile stored on the storage facility upon receiving the second information.

* * * * *